United States Patent [19]
Takahashi et al.

[11] Patent Number: 5,232,582
[45] Date of Patent: Aug. 3, 1993

[54] WATER PURIFYING APPARATUS HAVING MOSS-PREVENTING FILTER AND MONITORED AIR INJECTION

[75] Inventors: Yutaka Takahashi; Ikuo Kobayashi, both of Nara; Masao Noguchi, Ikoma; Nobuyuki Hirai, Neyagawa; Keiko Nakanishi; Masanobu Hattori, both of Nara, all of Japan

[73] Assignee: Matsushita Electric Industrial Co., Ltd., Kadoma, Japan

[21] Appl. No.: 836,845

[22] Filed: Feb. 19, 1992

[30] Foreign Application Priority Data

Feb. 20, 1991 [JP] Japan .................. 3-26133
Apr. 8, 1991 [JP] Japan .................. 3-74963

[51] Int. Cl.⁵ .................. B01D 17/12; B01D 36/00
[52] U.S. Cl. .................. 210/86; 210/87; 210/94; 210/121; 210/136; 210/143; 210/169; 210/202; 210/258; 210/500.1; 261/3; 261/5; 261/76; 261/DIG. 75
[58] Field of Search .................. 119/3, 5; 210/87, 90, 210/97, 136, 143, 169, 202, 203, 150, 151, 620, 85, 94, 149, 614, 121, 192, 257.1, 258, 259; 261/DIG. 75, 1-5, 76

[56] References Cited

U.S. PATENT DOCUMENTS

| | | | |
|---|---|---|---|
| 3,669,883 | 6/1972 | Huckstedt et al. | 210/169 |
| 4,043,299 | 8/1977 | Birkbeck et al. | 119/3 |
| 4,052,960 | 10/1977 | Birkbeck et al. | 119/3 |
| 4,130,481 | 12/1978 | Chase et al. | 210/614 |
| 4,240,376 | 12/1980 | Kominami et al. | 119/4 |
| 4,297,222 | 10/1981 | Takeguchi et al. | 210/169 |
| 4,476,720 | 10/1984 | Ismail et al. | 73/204.23 |
| 4,634,560 | 1/1987 | Eckert | 261/76 |
| 5,135,684 | 8/1992 | Mohn et al. | 261/DIG. 75 |

FOREIGN PATENT DOCUMENTS

| | | | |
|---|---|---|---|
| 3031492 | 4/1982 | Fed. Rep. of Germany | 119/5 |
| 3516617 | 11/1986 | Fed. Rep. of Germany | 119/5 |
| 3637736 | 5/1988 | Fed. Rep. of Germany | |
| 2354048 | 1/1978 | France | |
| 1-262989 | 10/1989 | Japan | |
| 2-191587 | 7/1990 | Japan | |
| 2-203996 | 8/1990 | Japan | 210/620 |
| 48270 | 5/1965 | Luxembourg | |
| 1017-241 | 8/1981 | U.S.S.R. | |

Primary Examiner—Joseph W. Drodge
Attorney, Agent, or Firm—Wenderoth Lind & Ponack

[57] ABSTRACT

A water purifying apparatus has feeding device for feeding water under pressure; a bacteria culturing tank; and air supply device for feeding air to the bacteria culturing tank by inducing air by utilizing fluid energy of circulating water; and an air flow detector provided on an air suction duct of the air supply means. A filter provided upstream of the feeding means for feeding water under pressure has the capability of preventing moss from growing in a water tank and sterilizing water. An ultraviolet lamp for sterilizing the water in a water tank is provided in a circulating duct. A carrier for fixing bacteria which grows aerobic and anaerobic bacteria is composed of a basic mineral material.

15 Claims, 13 Drawing Sheets

Fig. 11
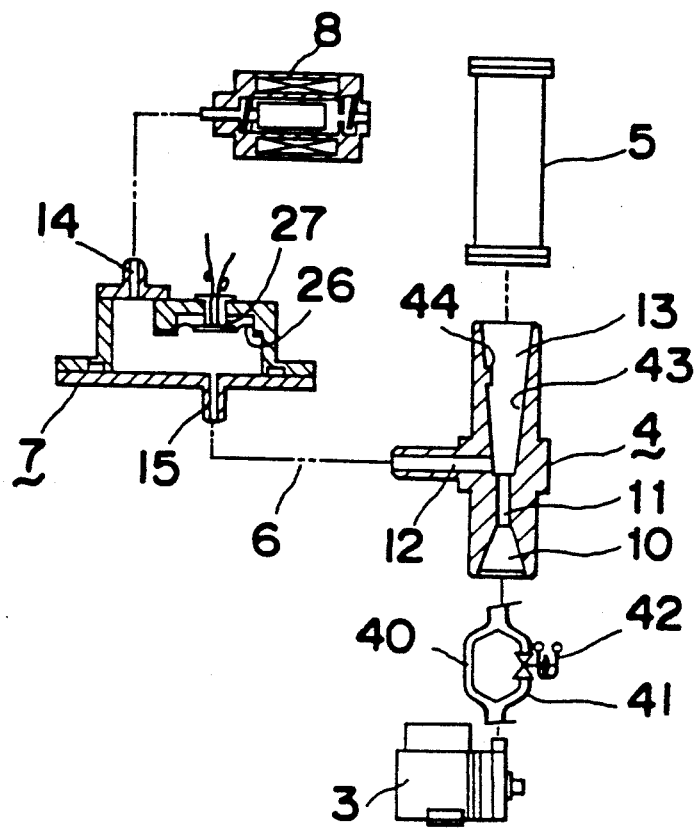
Fig. 12
(a) 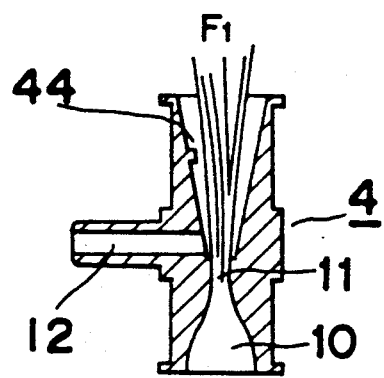
(b) 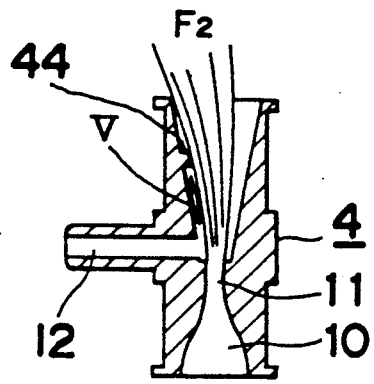

WATER PURIFYING APPARATUS HAVING MOSS-PREVENTING FILTER AND MONITORED AIR INJECTION

BACKGROUND OF THE INVENTION

1. Field of the Invention

The present invention relates to a water purifying apparatus for purifying water in a water purifying tank or in a fish tank.

2. Description of the Related Art

Water contained in a water storing tank, an artificial pond, a pool or the like may become polluted with contaminants such as organic substances. Research has been made to develop a purifier having a favorable purifying performance.

The water in a fish tank is contaminated with organic substances such as the excrement of fish or food which has not been eaten and products formed as a result of the decomposition of organic substances. As a result, disease-producing germs grow. In addition, nitrous acid or nitric acid is formed while a nitrogen compound such as ammonia is being decomposed.

As disclosed in U.S. Pat. No. 4240376, water is purified by circulating water between a water tank and a purifying tank having a filter for removing ammonia and between the water tank and a purifying tank having a filter for removing organic substances. Ion exchange resin, zeolite, activated carbon, and silica are selected as the materials of the filters. An air blower for feeding air is provided in a lower portion of the purifying tank. According to the purifying operation of the apparatus, ammonia and organic substances contained in the water of the water tank are eliminated by the filters, and carbon dioxide and acid radicals are removed by the air provided by the air blower.

However, in the above construction, while ammonia and organic substances are eliminated by the filters, the filters will deteriorate in performance with the passage of time. The air blower used to remove carbon dioxide and acid radicals does not have a long life. As such, it is necessary to replace the filters and the air blower frequently.

In addition, bacteria stick to the filters and slime is generated thereon. Therefore, the filters are liable to be clogged.

Further, in the fish tank, ammonia in the water is decomposed to form nitric acid which reduces the pH of the water in the bacteria culturing tank. Thus, the purifying performance of bacteria which decompose nitrogen compounds deteriorates and germs or moss grows in the water contained in the water tank.

SUMMARY OF THE INVENTION

Accordingly, it is an essential object of the present invention to provide a water purifying apparatus which maintains the purifying performance for a long period of time by means of bacteria which are grown in a large quantity of bacteria in a bacteria culturing tank and maintained in an optimum condition.

It is another object of the present invention to provide a water purifying apparatus in which air is supplied not by an air blower having a limited life, but by an air supply means which induces air by utilizing the jet flow of circulating water.

It is a still another object of the present invention to provide a water purifying apparatus which prevents a bacteria culturing tank from suddenly deteriorating in its purifying performance and keeps the water in a water tank clean by promptly detecting and taking appropriate counter-measures against the deterioration of the water circulating performance due to the performance decline of a water feeding means and that of an air supply means provided in the circulation circuit between the water tank and the bacteria culturing tank and due to the increase of resistance of a water circulating duct.

It is a further object of the present invention is to provide a water purifying apparatus for keeping the water in a water tank clean so as to prevent fish being bred in the water tank from being killed by germs.

It is a still further object of the present invention to provide a water purifying apparatus which prevents aerobic bacteria in a bacteria culturing tank and fish being bred in a fish tank from suffering from an insufficiency of oxygen by detecting the decline of the purifying performance due to the reduction of the flow rate of circulating water, driving an informing means to transmit the performance decline of the purifying apparatus to an external device, and driving an auxiliary air supply means.

It is another object of the present invention to provide a water purifying apparatus which prevents a filter from being clogged to allow water to circulate at a predetermined flow rate.

It is still another object of the present invention to provide a water purifying apparatus which uses a basic mineral substance as the material of a carrier for fixing bacteria which are grown to purify water so that the apparatus has a high purifying performance.

It is another object of the present invention to provide a water purifying apparatus which prevents germs or moss from growing in a water tank.

In accomplishing these and other objects, there is provided a water purifying apparatus comprising: feeding means for feeding water under pressure; a bacteria culturing tank; and air supply means for feeding air to the bacteria culturing tank by inducing air by utilizing fluid energy of circulating water. In the above construction, the feeding means, the bacteria culturing tank, and the air supply means are serially provided in forced circulating duct for circulating water in a water tank.

According to another preferred embodiment, there is provided a water purifying apparatus comprising: auxiliary air supply means for aiding the operation of the air supply means; and auxiliary air control means for controlling the operation of the auxiliary air supply means based on a signal outputted from the air flow detecting means.

According to another preferred embodiment, there is provided a water purifying apparatus comprising: means for varying the flow rate of circulating water; and safety confirming means for confirming that the auxiliary air supply means has actuated in response to a signal outputted from the air flow detecting means when the flow rate of circulating water is smaller than a predetermined value.

According to another preferred embodiment, there is provided a water purifying apparatus comprising: a moss-growth preventing/sterilizing filter provided serially in a circulating duct through which the water in a water tank circulates; means for feeding water under pressure; a bacteria culturing tank for culturing aerobic and anaerobic bacteria; and air supply means for feeding air to the bacteria culturing tank by inducing air by means of fluid energy of a circulation flow. In the above construction, the moss-growth preventing/sterilizing filter, the means for feeding water under pressure, the bacteria culturing tank, and the air supply means are serially provided in a forced circulating duct for circulating water in a water tank. The filter unit consists of at least one of the following moss-growth preventing/sterilizing materials 1 through 12:

1. silver or silver chloride
2. chlorohexydine gluconate
3. copper or copper sulfide
4. titanium
5. 5-chloro-2-(2,4-dichlorophenoxy) phenol
6. stainless steel
7. dodecylguanidine hydrochloride
8. thiapentazole
9. a-Bromocinnamaldehyde
10. silicone quaternary ammonium salt
11. Alkyldi (aminoethyl) glycine hydrochloride
12. 10,10'-Oxybisphenoxyarsine The fixing floor for growing bacteria is composed of a basic material containing CaO, $SiO_2$, $Al_2O_3$, MgO, FeO in a large quantity.

According to the above embodiment, contaminants in the water of a water tank are fed from the air supply means to the bacteria culturing tank by the means for feeding water under pressure. The air supply means induces contaminants by means of the fluid energy of circulating water. Then, contaminants are atomized by a jet flow section and introduced into the bacteria culturing tank. Thereafter, contaminants are decomposed by bacteria and removed. The decomposition/removal operation of bacteria can be improved and the performance thereof can be maintained for a long period of time by atomizing supplied oxygen and activating the propagation of bacteria.

While the pump serving as the means for feeding water under pressure is circulating water, the pump feeds, to the bacteria culturing tank, the water in the water tank containing organic substances such as the excrement of fish and food which remains uneaten and ammonia or nitrate formed by the organic substances in the water tank, with air sucked by the air supply means taken into the water. Ammonia in the water in the water tank is efficiently oxidized by bacteria which have been artificially cultured on the surface of a mineral substance to form nitrate in an atmosphere in which a large quantity of oxygen exists. That is, the water is purified.

The air supply means supplies air to the bacteria culturing tank not by a rotary or movable member, but by utilizing air induction generated by the jet flow of the circulating water. Therefore, the air supply means is very durable.

When the air supply means sucks air in a reduced amount or stops sucking air as a result of the reduction of the flow rate of the circulating water, the informing means actuates in response to a signal outputted from the air flow detecting means. Consequently, the deterioration of the purifying performance is indicated to an external device. Simultaneously with the actuation of the informing means, the auxiliary air supply means is actuated to supply air.

The means for varying the flow rate of the circulating water is operated to forcibly reduce the flow rate in order to check whether or not the apparatus is normally operating. If it is detected that the flow rate has decreased, the air flow detecting means generates a signal indicating that the air suction amount of the air supply means has decreased. Thus, the situation of the reduction of air suction amount can be inspected.

The moss-growth preventing/sterilizing filter unit provided upstream of the means for feeding water under pressure removes foreign matter such as slime formed by moss, Protozoa, rubbish, shells or pathogenic microorganism.

Even though nitric acid is formed in the bacteria culturing tank as a result of the decomposition of ammonia, nitric acid is neutralized by a basic mineral substance. Thus the pH of the water can be prevented from being reduced.

Bacteria or moss which has grown in the water tank is fed to the bacteria culturing tank and sterilized by the ultraviolet lamp.

BRIEF DESCRIPTION OF THE DRAWINGS

These and other aspects and features of the present invention will become clear from the following description taken in conjunction with the accompanying drawings, in which:

FIG. 11 is a sectional view with the parts separated showing the construction of means for varying the flow rate of circulating water of a water purifying apparatus according to the above embodiment, for safety checking, of the present invention;

FIGS. 12a and 12b are sectional views showing the air supply means of the water purifying apparatus of FIG. 11 in different stages of operations;

DETAILED DESCRIPTION OF THE INVENTION

Figure 1:
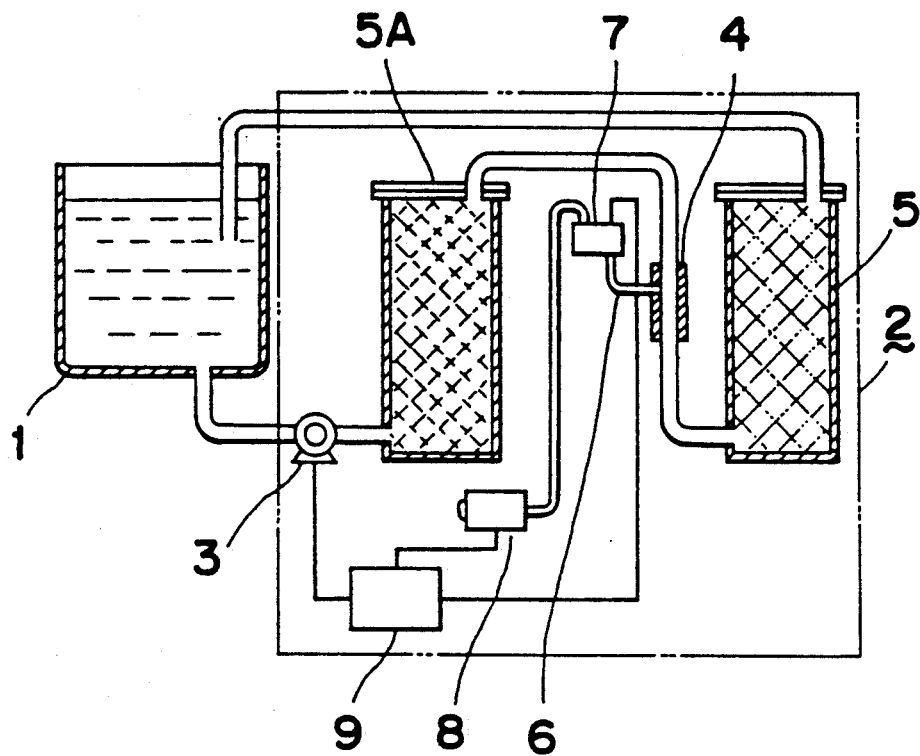
FIG. 1 is a sectional view showing a water purifying apparatus according to an embodiment of the present invention.

Before the description of the present invention proceeds, it is to be noted that like parts are designated by like reference numerals throughout the accompanying drawings.

Referring to FIG. 1, in a water purifying unit 2, the water of a water tank 1 is purified by a purifying circulation circuit comprising a means 3 for feeding water under pressure; an air supply means 4 utilizing the fluid energy of circulation flow so as to introduce external air into water which is flowing owing to a high speed jet flow-caused ejecting operation for inducing air; and an aerobic bacteria culturing tank 5 having a bacteria fixing carrier consisting of mineral substances mounted therein and positioned downstream of the air supply means 4. An anaerobic bacteria culturing tank 5A in which bacteria propagate without an air supply is serially connected in a water circulating duct.

An air flow detecting means 7 and an auxiliary air supply means 8 are connected in an air inflow duct 6 of the air supply means 4. The water feeding means 3, the air flow detecting means 7, and the auxiliary air supply means 8 are electrically connected with a control means 9. In this construction, when the water circulating performance decreases, the air flow detecting means 7 detects a decrease of air flow rate, thus outputting a signal to the control means 9. According to an instruction outputted from the control means 9, the auxiliary air supply means 8 operates to supply air to the bacteria culturing tank 5 through the air flow detecting means 7 and the air supply means 4. Therefore, the purifying performance of the bacteria culturing tank 5 does not suddenly decrease.

Figure 2:
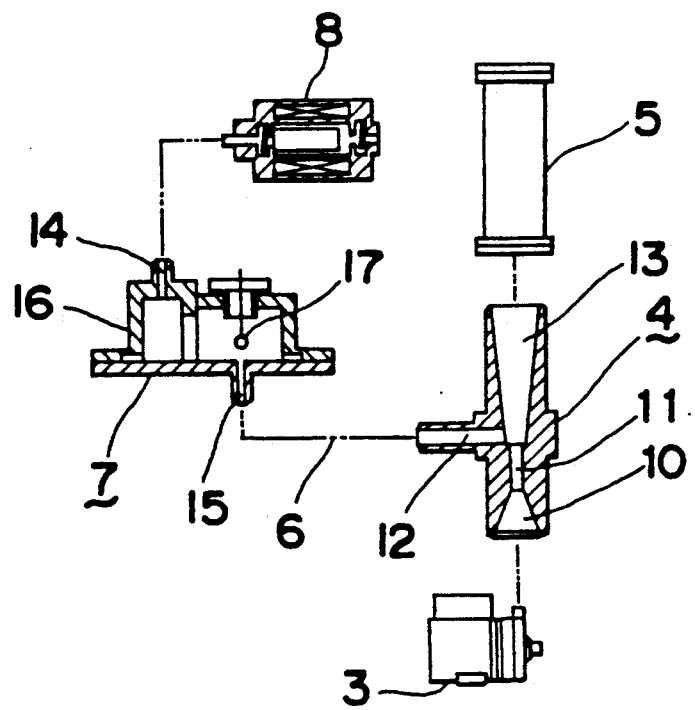
FIG. 2 is a sectional view, in which principal portions are separated showing the water purifying apparatus according to the above embodiment of the present invention.

FIG. 2 shows the water flow and air flow in the water purifying unit 2. The air supply means 4 comprises a supply duct 10 communicating with the water feeding means 3; a supply nozzle 11 for feeding the circulating water at a high speed; an air suction port 12 into which air flows by the ejecting operation generated by the high-speed jet flow; and an outflow duct 13 from which a mixture of sucked air and a circulating water flow flows out to the culturing tank 5. The air inflow port 12 is connected with the air suction duct 6 connected serially with the air flow detecting means 7 and the auxiliary air supply means 8.

The air flow detecting means 7 comprises a water container 16 having an air inlet (port) 14 and an air outlet (port) 15 and a self-heating thermistor 17 provided in the water container 16.

Figure 3:
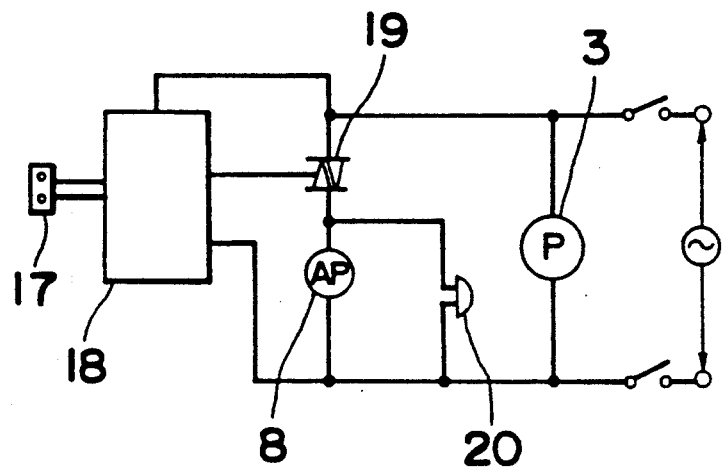
FIG. 3 is a control circuit diagram view for the water purifying apparatus according to the above embodiment of the present invention.

FIG. 3 shows the control system of the apparatus. An electronic circuit 18 outputs a drive signal for the circuit of the control means 9 in response to a signal outputted from the thermistor 17 constituting the air flow detecting means 7. A triode AC switch (TRIAC) 19 operates in response to the drive signal outputted from the electronic circuit 18, thus turning on and off the auxiliary air supply means 8 and an informing means 20.

According to the above construction, in normal operation, upon driving of the water feeding means 3, the air supply means 4 sucks air by the ejecting operation. As a result, air flows through the auxiliary air supply means 8 to the air inlet (port) 14 of the air flow detecting means 7 and to the air outlet (port) 15 thereof. Consequently, the water container 16 of the air flow detecting means 7 is filled with air and the thermistor 17 discharges heat in a comparatively small amount and has a high temperature. Therefore, the resistance of the thermistor 17 becomes low. As a result, a signal indicating that the air supply means 4 is operating normally is generated and inputted to the electronic circuit 18. As a result, the auxiliary air supply means 8 and the informing circuit 20 are turned off. The turn-off of the informing circuit 20 means that the apparatus is operating normally.

When the flow rate of the circulating water decreases as a result of an increased resistance of the circulation circuit due to the excrement of fish or food which remains uneaten in the water tank 1, the speed of the jet flow decreases and the ejecting performance of the air supply means 4 is reduced. As a result, water flows out backward from the air suction port 12, thus flowing backward through the air suction duct 6 to the air flow detecting means 7 and as such the water container 16 is filled with water, and the thermistor 17 discharges a great quantity of heat and the temperature thereof decreases, so that the resistance thereof becomes high. As a result, a signal indicating that the air supply means 4 has stopped sucking air is generated and inputted to the electronic circuit 18. As a result, the auxiliary air supply means 8 and the informing circuit 20 are turned on. Upon turn-on of the informing circuit 20, an abnormal drive indication signal is issued. Consequently, the auxiliary air supply means 8 feeds air under pressure to the air flow detecting means 7 and the air supply means 4.

According to the embodiment, air sucked in by the air supply means 4 is atomized by a high-speed jet flow fed out from the supply nozzle 11 and dispersed uniformly in water. As a result, bacteria are activated and cultured in the culturing tanks at a nigh density.

Figure 4:
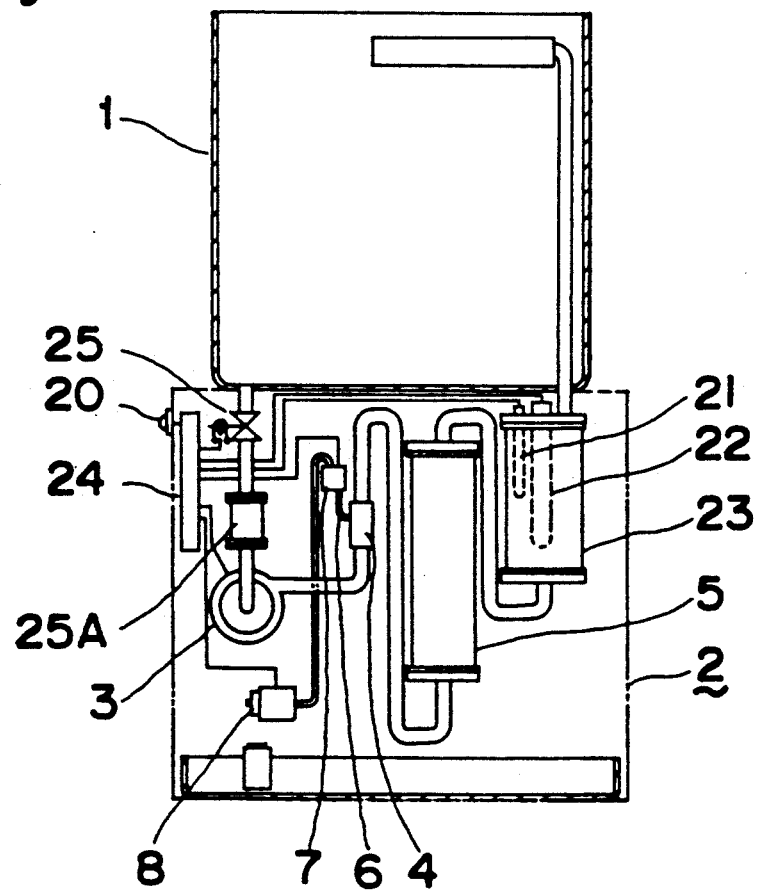
FIG. 4 is a sectional view showing a purifying apparatus applied to a fish tank according to an embodiment of the present invention.
Figure 5:
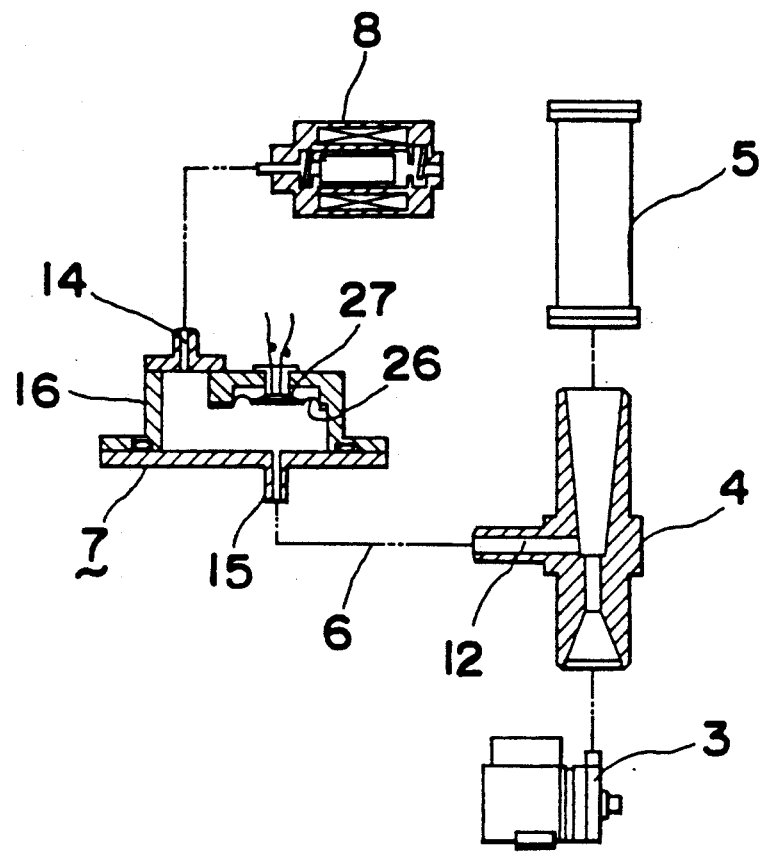
FIG. 5 is a sectional view, in which principal portions are separated, the purifying apparatus applied to the fish tank according to the above embodiment of the present invention.

FIGS. 4 and 5 show an embodiment of the water purifying apparatus applied to a fish holding tank. The water purifying unit 2 comprises the circulation pump 3 serving as the means for feeding water under pressure; the air supply means 4 for inducing external air by fluid energy of the circulating water; the bacteria culturing tank 5 having a bacteria fixing carrier consisting of mineral substances mounted therein and positioned downstream of the air supply means 4; a heat-sterilizing unit 23 positioned downstream of the bacteria culturing tank 5 and including a heater 21 and an ultraviolet lamp 22.

The air flow detecting means 7 and the auxiliary air supply means 8 are serially inserted in the air suction duct 6 of the air supply means 4. A control means 24 is connected with the circulation pump 3; the auxiliary air supply means 8; the informing circuit 20; the heater 21; the ultraviolet lamp 22; an electromagnetic valve 25; and the pressure sensor 17 provided in the air flow detecting means 7. A moss-growth/sterilizing filter unit 25A removes large solid matters in the circulating water.

Aerobic bacteria are cultured in the bacteria culturing tank 5. The bacteria fixing carrier consists of saddle lock type ceramic consisting of blast furnace slag. The blast furnace slag is produced by rapidly cooling slag produced in an iron foundry in an amount of approximately 0.5 tons per 1.0 ton of melted iron and is used mainly as a cement material or a soil improving material. The blast furnace slag comprises $CaO$, $SiO_2$, and $Al_2O_3$ and in addition contains $MgO$ and $FeO$.

FIG. 5 shows another construction of the air flow detecting means 7 comprising the water container 16 having the air inlet (port) 14, the air outlet (port) 15 and a pressure sensor 27 provided in the water container 16 on a pressure receiving diaphragm 26.

Figure 6:
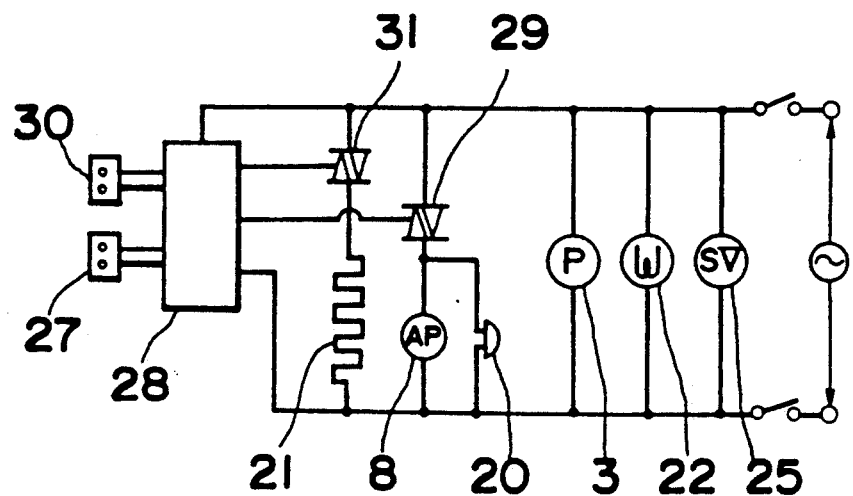
FIG. 6 is a control circuit diagram for the purifying apparatus applied to the fish tank according to the above embodiment of the present invention.
Figure 7:
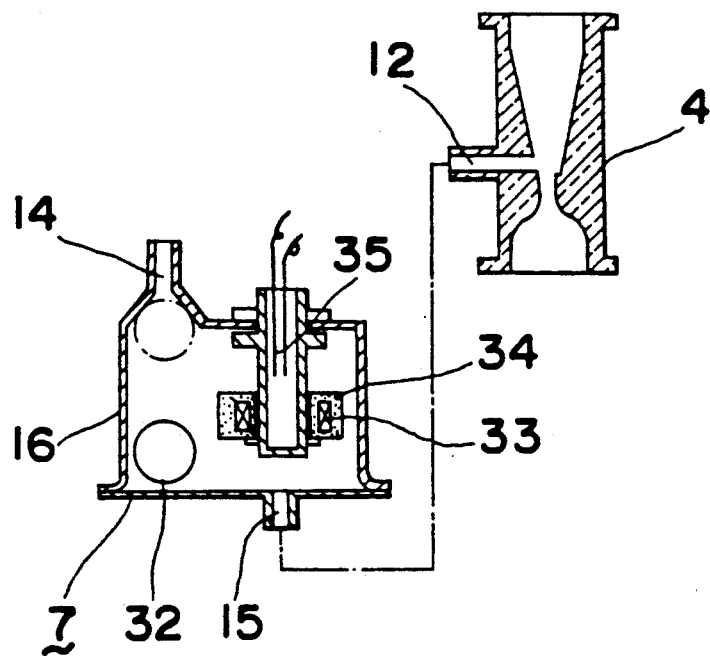
FIG. 7 is a sectional view showing an air flow detecting means of a water purifying apparatus according to an embodiment of the present invention.
Figure 8:
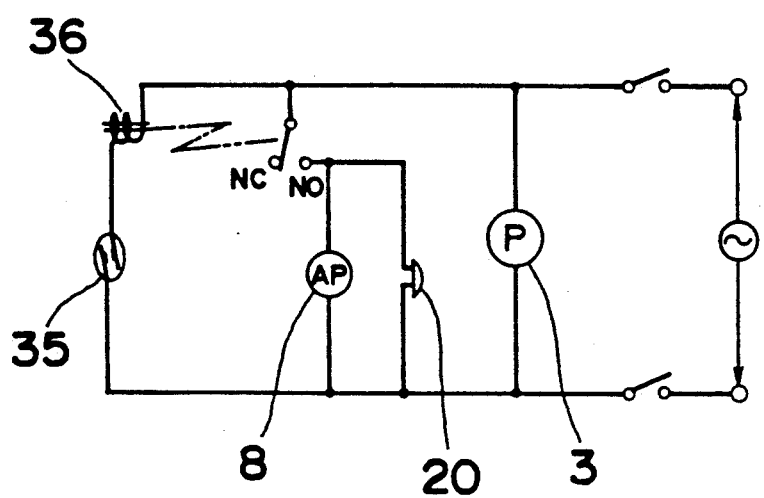
FIG. 8 is the control circuit diagram for the air flow detecting means of the water purifying apparatus according to the above embodiment of the present invention.
Figure 9:
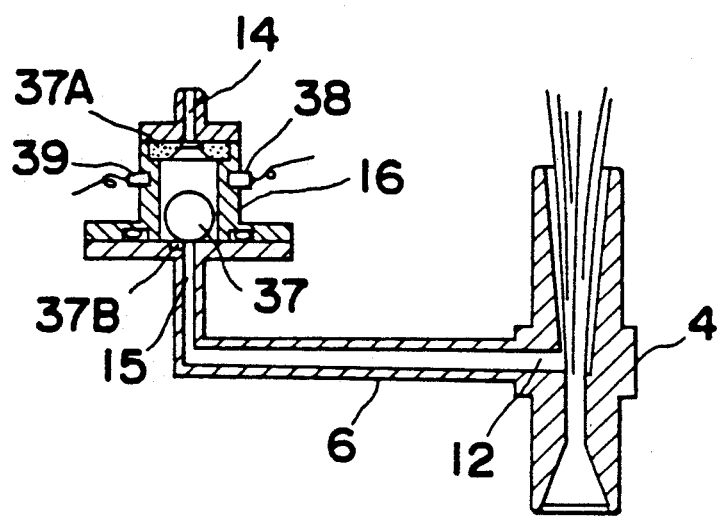
FIG. 9 is a sectional view showing an air flow detecting means of a water purifying apparatus according to an embodiment of the present invention.
Figure 10:
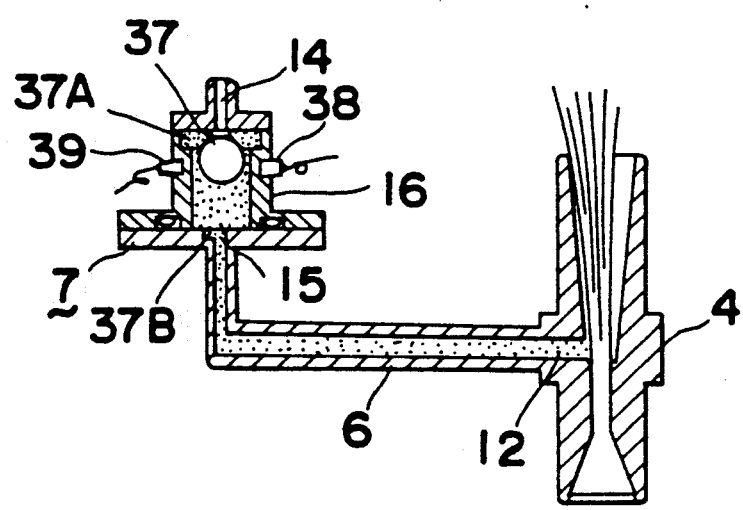
FIG. 10 is a view similar to FIG. 9 showing the air flow detecting means of the water purifying apparatus according to FIG. 9 in a different state of operation.

FIG. 6 shows the control system of the apparatus. An electronic circuit 28 outputs a drive signal for the circuit of the control means 9. The electronic circuit 28 operates a TRIAC 29 in response to a signal outputted from the pressure sensor 27 provided in the air flow detecting means 7 so as to turn on and off the auxiliary air supply means 8 and the informing circuit 20. In addition, the electronic circuit 28 operates a TRIAC 31 in response to a signal outputted from a thermistor 30 serving as a water temperature detecting means provided in the water tank 1, thus operating a TRIAC 31 so as to turn on and off the heater 21 provided in the heat-sterilizing unit 23.

According to the above construction, in normal drive, the air supply means 4 sucks air by its ejecting operation. As a result, air flows from the air inlet (port) 14 to the air outlet (port) 15 from the auxiliary air supply means 8. Thus, the pressure inside the water container 16 of the air flow detecting means 7 becomes negative. The pressure sensor 27 detects the negative pressure, thus outputting a signal indicating that the air supply means 4 is normally operating to the electronic circuit 28. As a result, the auxiliary air supply means 8 and the informing circuit 20 are turned off. The turn-off of the informing circuit 20 indicates the normal drive.

In the normal drive, water containing organic substances such as the excrement of fish and food which remains uneaten and ammonia or nitrate generated from the organic substances in the water tank 1 is introduced into the circulation pump 3 through the electromagnetic valve 25 and the filter unit 25A, and is then pressurized by the circulation pump 3. Thereafter, air which has been sucked and atomized through the air supply means 4 is dispersed uniformly in the water. Then, the water flows into the water tank 1 via the bacteria culturing tank 5 and the heat-sterilizing unit 23. In this circulation system, the organic substances in the water such as the excrement of fish and food which remains uneaten and ammonia or nitrate generated from the organic substances in the water tank 1 are oxidized by artificially cultured aerobic bacteria which have attached to the bacteria fixing floor consisting of mineral substances, activated substances thereof, and oxygen contained in air sucked in by the circulating water. As a result, nitrate is formed. The decomposition of ammonia to nitrate is expressed by the following equations 1 and 2:

$$NH_4^+ + 1.5O_2 \rightarrow NO_2^- + H_2O + H^+ \tag{1}$$

$$NO_2^- + 0.5O_2 \rightarrow NO_3 \tag{2}$$

Thus, the organic substances such as the excrement of fish and food which remains uneaten and ammonia generated from the organic substances are oxidized to form nitrate which is harmless. Consequently, the water in the water tank 1 is purified.

The pathogenic fungi of fish which have propagated themselves in the water tank 1 are sterilized by ultraviolet rays of the heat-sterilizing unit 23. The ultraviolet rays of the heat-sterilizing unit 23 act to remove free chlorine, thus having a function of improving the environment for breeding fish.

As described above, free chlorine contained in city water, organic substances or ammonia generated in the water tank 1 or the pathogenic fungi of fish therein are respectively decomposed by artificially cultured bacteria which have attached to the surface of mineral substance in the tanks or sterilized by ultraviolet rays in sterilizing unit 23.

The air supply means 4 sucks atmospheric air from the air suction duct 6 by the ejecting operation generated by the jet flow produced by the supply nozzle 11, thus feeding air into the circulating water. At this time, the amount of oxygen contained in air sucked by the air supply means 4 is made to be greater than the amount necessary for oxidizing ammonia according to the reactions as shown in the equations 1 and 2 so that water containing excess oxygen is fed to the water tank 1. Thus, it is unnecessary to carry out aeration by means of an air pump unlike the conventional art.

When the flow rate of the circulating water decreases as a result of an increased resistance of the circulation circuit due to the excrement of fish or food which remains uneaten in the water tank 1, the speed of the jet flow decreases. As a result, the performance of the ejecting operation of the air supply means 4 is reduced. Consequently, water flows out backward from the air suction port 12 and as such the water container 16 of the air flow detecting means 7 has a positive pressure. The pressure sensor 27 detects the positive pressure, thus generating a signal indicating that the air supply means 4 has stopped sucking air and inputting the signal to the electronic circuit 18. As a result, the auxiliary air supply means 8 and the informing circuit 20 are turned on. Upon turn-on of the informing circuit 20, an abnormal drive indication is issued. Consequently, the auxiliary air supply means 8 is operated and feeds air under pressure to the air flow detecting means 7 and the amount of air being sucked in supply means 4 in order to supplement air.

The blast furnace slag used as a mineral substance consists of porous glass and contains CaO, $SiO_3$, and $Al_2O_3$ as main components and in addition, MgO and FeO as shown in Table 1 below. One of the main components CaO neutralizes $H^+$ produced when ammonia is oxidized (reactions equations 1 and 2), thus preventing the decrease of the pH of the water in the water tank 1.

TABLE 1

| Composition (%) of blast furnace slag | | | | | |
|---|---|---|---|---|---|
| CaO | $SiO_3$ | $Al_2O_3$ | MgO | FeO | other substance |
| 43.3 | 33.3 | 14.1 | 7.1 | 0.7 | 1.5 |

In water, divalent positive ions such as calcium exist on the surface of the mineral substance including CaO as a main component. In view of the fact that bacteria are charged negatively, the surface of the blast furnace slag consisting of the mineral substance is an optimum carrier for fixing bacteria which have been artificially cultured.

According to the construction of this embodiment, sucked air is atomized by a bubble-pulverizing operation of a high-speed jet flow in a low pressure atmosphere generated by the ejecting operation of the jet flow and bubbles are contained uniformly in the water. Thus, the aerobic bacteria are actively activated.

Further, a back-up function is provided for when the quantity of oxygen becomes short in the apparatus. Therefore, an abnormality which has occurred in the purifying unit does not affect the ecology of the aerobic bacteria or that of the fish and is detected by the abnormal air supply indication. Thus, a failure of the apparatus is corrected to restore the operation thereof to normal operation.

FIGS. 7 and 8 show a different embodiment of the air flow detecting means 7. Referring to FIG. 7, the water container 16 having the air inlet (port) 14 and the air outlet (port) 15 accommodates a check valve 32 consisting of a ball, the specific gravity of which is smaller than one, a float 34 enclosing a magnet 33, the specific gravity of which is smaller than one, and a lead switch 35.

The lead switch 35 of the air flow detecting means 7 is inserted in the exciting circuit of a change-over relay 36 which turns the auxiliary air supply means 8 and the informing circuit 20 on and off as shown in FIG. 8.

In the normal drive of the apparatus with the above construction, when the circulation pump 3 is driven, the air supply means 4 sucks in air by its ejecting operation. As a result, air flows from the air inlet (port) 14 of the air flow detecting means 7 to the air outlet (port) 15 thereof and the water container 16 of the air flow detecting means 7 is thus filled with air. At this time, the float 34 is positioned below the operation position of the lead switch 35, the check valve 32 is positioned at the bottom of the water container 16, and the lead switch 35 is turned off. In this condition, a signal indicating that the air supply means 4 is normally operating is generated and the contact of the change-over relay 36 is connected with the normal close (NC) side, with the result that the auxiliary air supply means 8 and the informing means 20 are turned off. The turn-off of the informing means 20 indicates that the water purifying apparatus is operating normally.

When the flow rate of circulating water decreases, the speed of the jet flow is reduced and as a result, the effectiveness of the ejecting operation of the air supply means 4 deteriorates. As a result, water flows out backward from the air suction port 12, thus flowing toward the air flow detecting means 7. When water has flowed into the water container 16, the float 34 moves upward above the operation position of the lead switch 35 and the check valve 32 moves upward to close the air inlet (port) 14 of the water container 16. As a result, the lead switch 35 is turned on. In this condition, a signal indicating that the air supply means 4 has stopped sucking air is generated and the contact of the change-over relay 36 is connected with the normal open (NO) side, with the result that the auxiliary air supply means 8 and the informing means 20 are turned on. The turn-on of the informing means 20 indicates an abnormal drive and simultaneously, air pressurized by the drive of the auxiliary air supply means 8 is fed under pressure into the air flow detecting means 7 and the air supply means 4 so as to supplement the air flow to the air supply means 4.

According to the construction of this embodiment, the control circuit can be constructed without using an electronic circuit and the malfunction of the control circuit due to electrical noise can be avoided.

FIGS. 9 and 10 show a different embodiment of the air flow detecting means 7. Referring to FIG. 9, a check valve 37 consisting of a non-transparent ball, the specific gravity of which is smaller than that of water is movably enclosed in the water container 16 having the air inlet (port) 14 and the air outlet (port) 15. A valve seat 37A is provided below the air inlet (port) 14 and a groove 37B forming an air duct is provided on the water container 16 side opening of the air outlet (port) 15. A light emitting member 38 and an optical sensor 39 are provided on opposite side walls of the water container 16 in opposition to each other.

When the circulation pump 3 is driven in the normal operation of the apparatus with the above construction, the air supply means 4 sucks in air by its ejecting operation. As a result, air flows from the air inlet (port) 14 of the air flow detecting means 7 to the groove 37B and the air outlet (port) 15 and consequently, the water container 16 is filled with air. At this time, since the check valve 37 is positioned at the bottom of the water container 16 as shown in FIG. 9, the optical sensor 39 receives light, thus generating a signal indicating that the air supply means 4 is normally operating and transmitting the signal to the control circuit.

When the flow rate of the circulating water decreases, the speed of the jet flow decreases and the effectiveness of the ejecting operation of the air supply means 4 deteriorates. As a result, water flows out from the air suction port 12 of the air supply means 4, thus flowing into the water container 16. Then, the check valve 37 moves upward, thus closing the air inlet (port) 14 of the water container 16 and taking a position between the light emitting member 38 and the optical sensor 39. As a result, the optical sensor 39 does not receive light from the light emitting member 38, thus generating a signal indicating that the air supply means 4 has stopped sucking air and transmitting the signal to the control circuit 28.

According to this construction, the check valve 37 and the detecting portion (optical sensor 39) are accommodated in the water container 16. Therefore, the air flow detecting means is compact. Hence, the water purifying apparatus is compact.

FIGS. 11, 12, 13, and 14 show an air supply checking system and the air supply means 4 according to another embodiment. Referring to FIG. 11, the water purifying unit comprises a circulation circuit comprising the circulation pump 3 serving as a means for feeding water under pressure, the air supply means 4 for introducing external air into flowing water by an ejecting operation, the aerobic bacteria culturing tank (module) 5 provided downstream of the air supply means 4; the air flow detecting means 7; and the auxiliary air supply means 8. The air flow detecting means 7 and the auxiliary air supply means 8 are provided in the air suction duct 6 of the air supply means 4. On the discharge side of the circulation pump 3, an electromagnetic valve 42 serving as the flow rate changing means is mounted in a bypass duct 41 bypassing a circulating duct 40.

The air supply means 4 comprises the supply duct 10 communicating with the circulation pump 3; the supply nozzle 11 for feeding the circulating flow at a high speed; an air suction port 12 for sucking in atmospheric air by the ejecting operation generated by the high-speed jet flow; the outflow duct 13, surrounded with a guide wall 43 tapered toward the bottom thereof, for causing the flowing out the mixture of sucked in air and the circulating water therethrough and a projection 44 formed on the guide wall 43 on the air suction port 12 side. The air inflow port 12 is connected with the air suction duct 6.

The air flow detecting means 7 for detecting the air pressure of the air supply means 4 comprises the water container 16 accommodating the air inlet (port) 14 and the air outlet (port) 15 and the pressure sensor 27 provided in the water container 16 via the pressure receiving diaphragm 26.

Referring to FIGS. 12a and 12b showing the pattern of the jet flow in the air supply means 4, $F_1$ indicates non-contact jet flow pattern in normal operation and $F_2$ shows contact jet flow pattern in abnormal operation, and V represents an eddy current generated when the jet flow contacts the guide wall 43.

Figure 13:
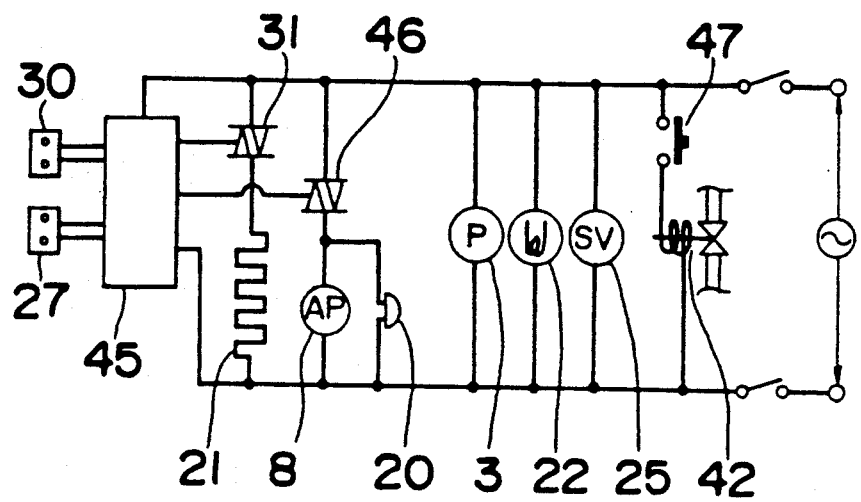
FIG. 13 is the control circuit diagram of the water purifying apparatus according to the above embodiment of the present invention.

Referring to FIG. 13 showing the control circuit of the water purifying apparatus according to the above-described embodiment, the control circuit comprises an electronic circuit 45 which outputs a drive signal to the control circuit in response to a signal outputted from the pressure sensor 27 of the air flow detecting means 7. In response to the signal outputted from the electronic circuit 45, a TRIAC 46 is actuated, thus turning on and off the auxiliary air supply means 8 and the informing means 20. The control circuit further comprises a switch 47 for turning on and off the electromagnetic valve 42. In response to information outputted from a thermistor 30 functioning as a means for detecting the water temperature of water in the water tank 1, the electronic circuit 45 outputs a control signal to a TRIAC 31, thus turning on and off the heater 21.

Figure 14:
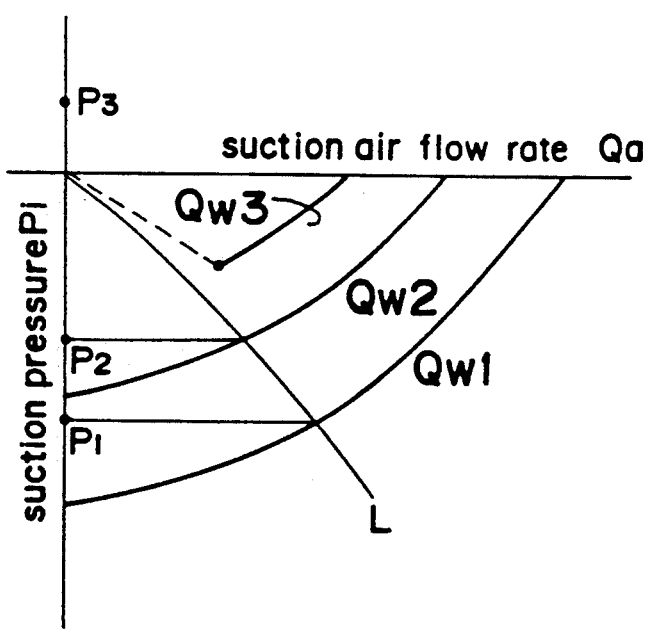
FIG. 14 is a graph showing the characteristic of air suction of the water purifying apparatus according to the above embodiment of the present invention.

FIG. 14 shows the characteristic of the air supply means 4. That is, FIG. 14 shows the relationship between an amount Qa of sucked in air and suction pressure Pi and in addition the resistance characteristic L of the air inflow duct 6, with the flow rate Qw of circulating water serving as a parameter.

When the apparatus of the above construction is in steady operation, the switch 47 of the control circuit of the checking system is turned on to open the electromagnetic valve 42 serving as the means for varying the flow rate of circulating water. When the electromagnetic valve 42 is opened, the resistance of the water circulating circuit is small. When the circulation pump 3 is driven in this condition, the flow rate of the circulating water becomes more than a predetermined value and as such, the jet flow fed out from the supply nozzle 11 of the air supply means 4 advances almost linearly as shown by $F_1$ of FIG. 12a and the air supply means 4 sucks in air by its ejecting operation. As a result, the air suction port 12 has a negative pressure and the pressure sensor 27 detects the negative pressure (FIG. 14: $P_1$), thus generating a signal indicating that the air supply means 4 is normally operating, and outputting the signal to the electronic circuit 45, with the result that the auxiliary air supply means 8 and the informing means 20 are turned off. The off condition of the informing means 20 indicates the normal drive of the apparatus.

In order to check the performance of the circulation circuit of the water purifying system, the switch 47 of the electromagnetic valve circuit is turned off to close the electromagnetic valve 42 serving as the means for varying the flow rate of the circulating water. When the circulation pump 3 is driven in this condition, the resistance of the duct of the water circulation circuit is increased. As a result, the flow rate of the circulating water decreases from $Q_{w1}$ to $Q_{w2}$ as shown in FIG. 14. When the jet flow fed out from the supply nozzle 11 of the air supply means 4 advances almost linearly as shown by $F_1$ of FIG. 12a, the air supply means 4 keeps sucking air and the air suction port 12 has a negative pressure. Consequently, the pressure sensor 27 detects the negative pressure (FIG. 14: $P_2$), which indicates that the apparatus is being normally driven. As a result, the auxiliary air supply means 8 and the informing means 20 remain turned off. The off condition of the informing means 20 indicates that the circulation circuit is in normal operation. Thus, the switch 47 is turned on and the electromagnetic valve 42 serving as the means for varying the flow rate of the circulating water is opened to return the operation of the purifying system (unit) to the steady operation.

In the above check on the performance of the circulation circuit of the purifying system by closing the electromagnetic valve 42, if the flow rate of the circulating water of the circulation circuit system of the water tank decreases from $Q_{w2}$ to $Q_{w3}$ which is smaller than the predetermined value due to the increase of the resistance of the circulation circuit and the reduction of the performance of the circulation pump 3 as shown in FIG. 14, the jet flow fed out from the supply nozzle 11 contacts the guide wall as shown by $F_2$ of FIG. 12b. As a result, a stable eddy current V is formed in a region surrounded by the projection 44 and the jet flow. Since the eddy current V increases static pressure, the air suction port 12 has a positive pressure. The pressure sensor 27 detects the positive pressure, thus generating a signal indicating that the air supply means 4 has stopped sucking air and outputting the signal to the electronic circuit 45. As a result, the auxiliary air supply means 8 and the informing means 20 are turned on. Thus, the deterioration of the performance of the purifying unit is indicated by the informing means 20, and the auxiliary air supply means 8 feeds air under pressure to the air flow detecting means 7 and the air supply means 4 to supplement the flow of air.

The cause of the performance deterioration of the purifying unit is then eliminated based on the indication of the informing means 20 so that a normal operation can be resumed Periodical checkings allow the anticipation of a change in the performance of the purifying unit, thus assuring the maintenance and the safety of the operation of the apparatus.

Figure 15:
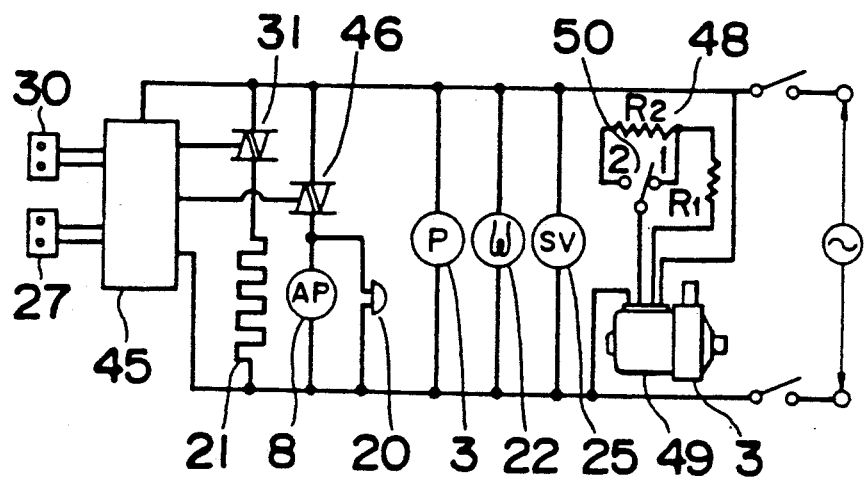
FIG. 15 is a motor control circuit diagram showing a means for varying the flow rate of circulating water according to the above embodiment of the present invention.

FIG. 15 shows the checking system of a water purifying apparatus using the air supply means according to another embodiment of the present invention. The control circuit includes a means for controlling the speed of rotation of the circulation pump 3 serving as the means for varying the flow rate of the circulating water. The control means 48 comprises resistors $R_1$ and $R_2$, for changing the exciting current of a pump motor 49, connected in series and a change-over switch 50 for setting the resistance value to $R_1$ or $R_1+R_2$ by contacting a contact 1 or a contact 2.

The operation of this embodiment is described below. In the steady operation the contact 1 of the changeover switch 50 of the control circuit of the checking system is contacted. During operation of the circulation pump 3 in this condition, the circulation pump 3 rotates in a predetermined direction and water flows in an amount greater than a predetermined value. In this case, the jet flow fed out from the supply nozzle 11 of the air supply means 4 advances almost linearly as shown by $F_1$ of FIG. 12a and the air supply means 4 is sucking in air by its ejecting operation.

The performance of the circulation circuit of the purifying system is checked by changing over the change-over switch 50 of the control circuit to contact 2 to increase the resistance of the circuit to $R_1+R_2$ to reduce exciting current. Thus, the speed of rotation of the circulation pump 3 is reduced. As a result, the flow rate of the circulating water decreases due to the change-over of the resistance similarly to the embodiment described with reference to FIGS. 11, 12, 13, and 14. Thus, the performance of the apparatus and a safety drive can be reliably checked.

According to this construction, the flow rate of the circulating water is changed by the switching of contacts of the electric circuit instead of using a movable member such as a valve in the circulating duct. Therefore, the flow rate of the circulating water can be reliably changed.

Figure 16:
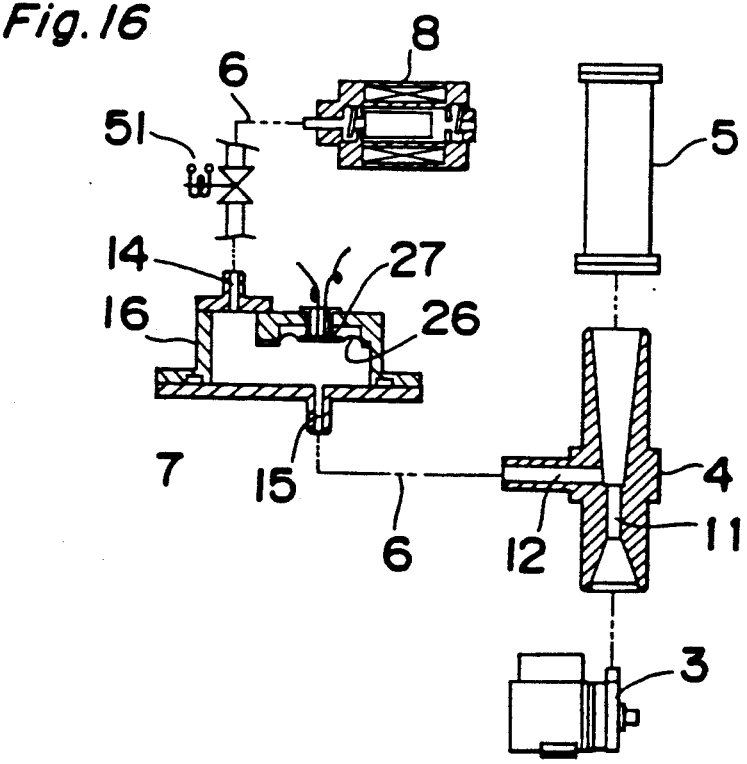
FIG. 16 is a sectional view, in which principal portions are separated, showing a water purifying apparatus according to another embodiment, for safety check, of the present invention.
Figure 17:
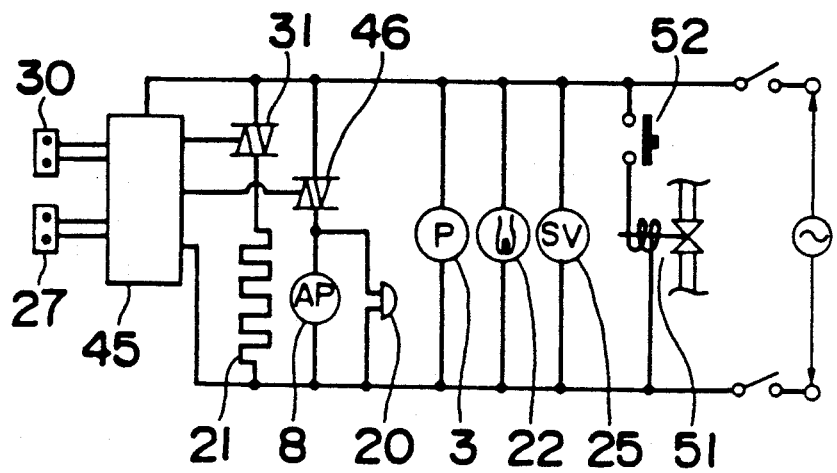
FIG. 17 is the control circuit diagram of the water purifying apparatus according to the above embodiment of the present invention.
Figure 18:
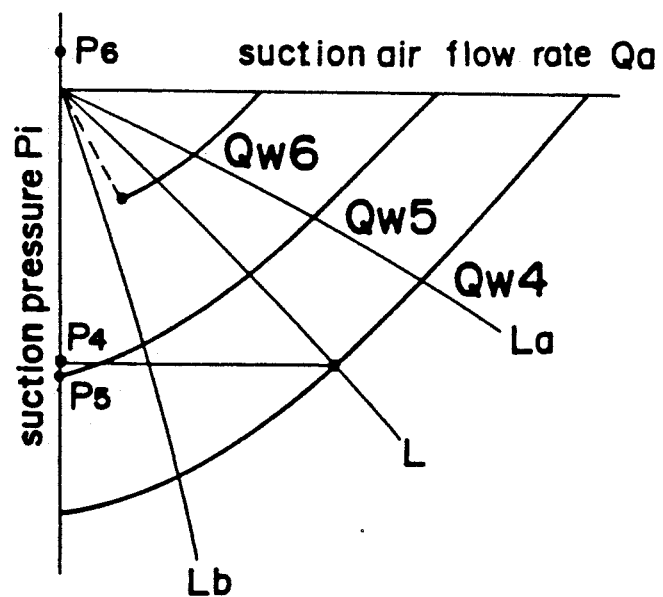
FIG. 18 is a graph showing the characteristic of air suction of the water purifying apparatus according to the above embodiment of the present invention.

FIGS. 16, 17, and 18 show a system for checking the water purifying apparatus using the air supply means according to an embodiment of the present invention. Referring to FIG. 16, the checking system comprises an air electromagnetic valve 51 serving as a resistance varying means for varying the load of the air inflow duct.

Referring to FIG. 17, the control circuit of the checking system comprises a checking switch 52 for closing the air electromagnetic valve 51 when the performance of the water purifying apparatus is to be checked.

FIG. 18 shows the characteristic of the air supply means 4. That is, FIG. 18 shows the relationship between an amount Qa of sucked in air and suction pressure Pi and in addition the resistance characteristic L of the air suction duct 6, with the flow rate Qw of the circulating water serving as a parameter. The resistance characteristic L is shown by La when the resistance is small and by Lb when the resistance is great.

The operation of the water purifying apparatus is described below. In the steady operation, the circulation pump 3 is driven with the contact of the checking switch 52 of the checking system control circuit closed and the air suction duct 6 opened. If the flow rate of the circulating water is greater than the predetermined value, the jet flow fed out from the supply nozzle 11 of the air supply means 4 advances almost linearly. Due to its ejecting operation, the characteristic of the suction force of the air supply means 4 is shown by $Q_{w4}$ in FIG. 18. That is, the air supply means 4 sucks in air at the intersection of the resistance characteristic L of the air suction duct 6 and $Q_{w4}$. Accordingly, the air suction duct 6 has a negative pressure. The pressure sensor 27 detects the negative pressure, thus generating a signal indicating that the air supply means 4 is operating normally and outputting the signal to the electronic circuit 45, with the result that the auxiliary air supply means 8 and the informing means 20 are turned off. The off state the informing means 20 indicates the normal drive of the apparatus.

The performance of the circulation circuit of the water purifying system is checked by opening the contact of the switch 52 of the control circuit of the checking system and thus closing the air electromagnetic valve 51. If the flow rate of the circulating water decreases in this state from the initial flow rate of the circulating water $Q_{w4}$ to $Q_{w5}$ to as shown in FIG. 18, the jet flow fed out from the supply nozzle 11 of the air supply means 4 advances almost linearly in this state. Supposing that the characteristic of the suction force of the air supply means 4 is shown by $Q_{w5}$ of FIG. 18, the air supply means 4 is sucking in air by its ejecting operation with the air suction duct 6 closed, i.e., the air supply means 4 is sucking in air on Y-axis ($P_5$). Therefore, the air suction duct 6 has a negative pressure. The pressure sensor 27 detects the negative pressure, thus outputting the signal indicating that the air supply means 4 is operating normally to the electronic circuit 45, with the result that the auxiliary air supply means 8 and the informing means 20 are turned off. The off state of the informing means 20 indicates that the circulation circuit of the purifying system is in a normal condition. Based on this decision, the checking switch 52 is closed to return the purifying system to the steady operation.

However, if the flow rate of the circulating water is reduced from an initial flow rate of the circulating water $Q_{w4}$ to a flow rate $Q_{w6}$ as shown in FIG. 18, at the flow rate $Q_{w6}$, the jet flow fed out from the supply nozzle 11 of the air supply means 4 contacts the guide wall with an increase of the load on the air suction port 6. As a result, a stable eddy current V is formed in a region surrounded with the projection and the jet flow. Since the eddy current V increases static pressure, the characteristic of the suction pressure of the air supply means 4 is shown by $Q_{w6}$ of FIG. 18. As a result, the pressure on Y-axis in FIG. 18 is $P_6$ with the air suction duct 6 closed. As a result, water flows out backward from the air suction port 12 and consequently, the air suction port 12 has a positive pressure. Consequently, the pressure sensor 27 detects the positive pressure $P_6$ shown in FIG. 18, thus generating a signal indicating that the air supply means 5 has stopped sucking in air and outputting the signal to the electronic circuit 45, which leads to the turn-on of the auxiliary air supply means 8 and the informing means 20. Thus, the performance deterioration of the purifying unit is indicated and the auxiliary air supply means 8 feeds air to the air flow detecting means 7 and the air supply means 4 so as to supplement the flow of air.

Because of the indication given by the informing means 20, the cause of the deteriorated performance of the purifying unit can be eliminated to return the drive of the purifying unit to the normal operation. Periodical checking as described above allows the monitor of the change in the performance of the purifying unit and keeps the purifying unit in good order.

Figure 19:
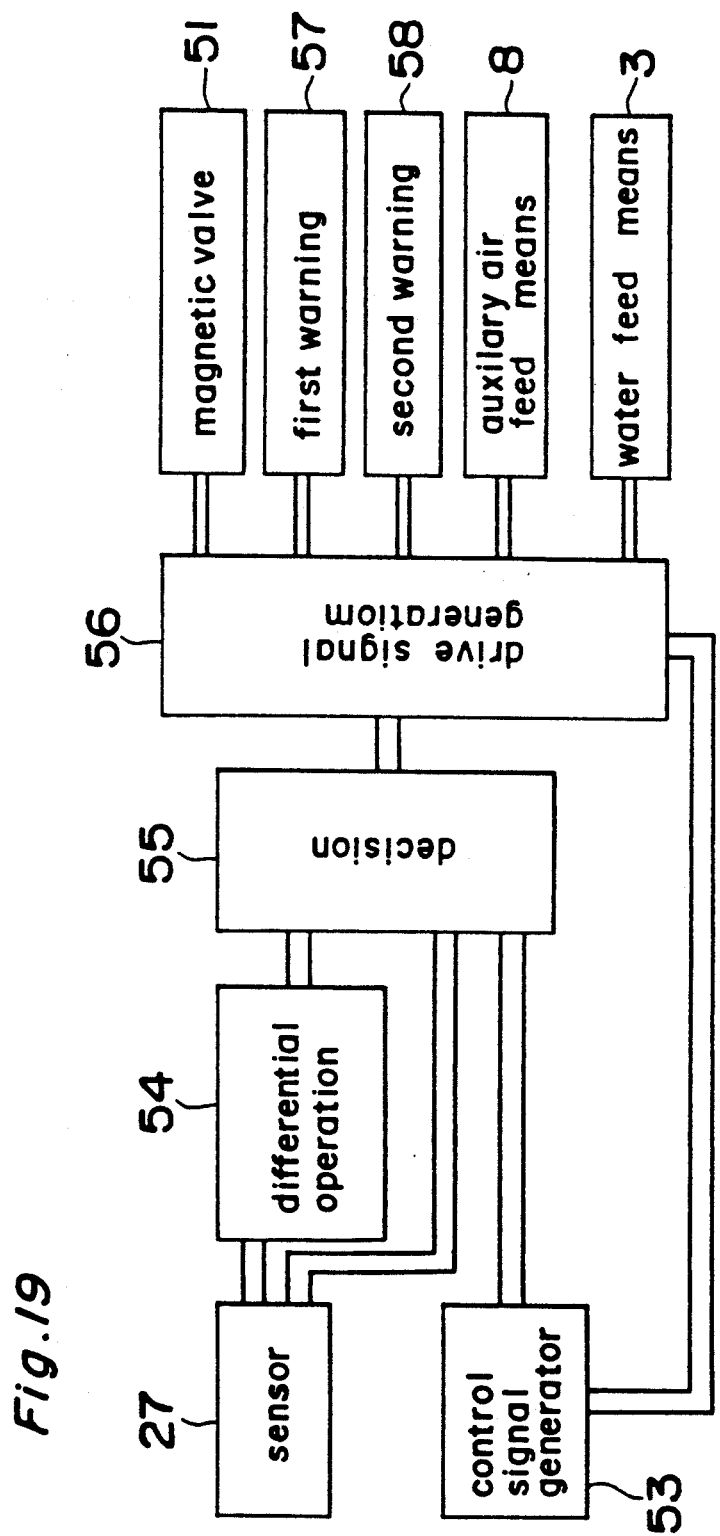
FIG. 19 is a diagrammatic view of a system for checking the performance of a water purifying apparatus according to another embodiment of the present invention.
Figure 20:
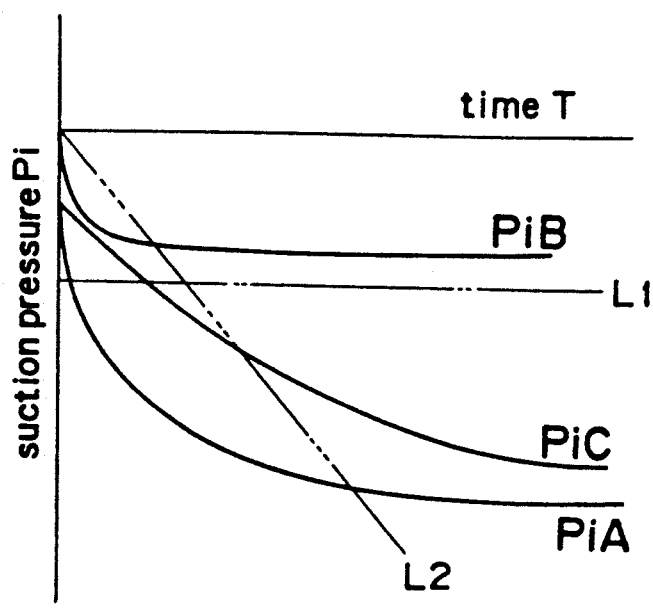
FIG. 20 is a graph showing the characteristic of air suction of the water purifying apparatus according to the above embodiment of the present invention.

FIGS. 19 and 20 show a checking system of the performance of the water purifying apparatus according to another embodiment of the present invention. The constructions of the parts of the water purifying unit 2 are identical to those of FIG. 16.

Referring to FIG. 19 showing a block control diagram, the control circuit of the water purifying unit 2 comprises a section 53 for generating a control signal such as a checking indication signal; a differentiating section 54; a deciding section 55 for deciding about a result obtained by the calculation performed by the differentiating section 54; and a drive signal generating section 56 for actuating an external driving device or devices. The external driving devices comprise the auxiliary air supply means 8; the air electromagnetic valve 51; a first informing means 57; a second informing means 58; and a means 3 for feeding water under pressure. The first indicates means 57 indicates the reduction of the flow rate of the circulating water. The second informing means 58 indicates increase of the resistance of the air inflow duct 6. The control circuits further comprises the pressure sensor 27 which is the same as that of the embodiment previously described with reference to FIG. 16.

FIG. 20 shows the characteristic of suction pressure Pi relative to the passage of time T when the air inflow duct 6 of the air supply means 4 is closed. PiA, PiB, and PiC of FIG. 20 show examples of a characteristic value; L1 indicates suction pressure; and L2 represents the limit value of variation.

In order to check the performance of the circulation circuit of the water purifying system, the control signal generating section 53 outputs a signal to the drive signal generating section 56. In response to this signal, the drive signal generating section 56 outputs a signal to the electromagnetic valve 51 so as to close the electromagnetic valve 51. Immediately after the electromagnetic valve 51 is closed, the differentiating section 54 starts inputting time and values outputted from the pressure sensor 27. The relationship between time T and the output value of the pressure sensor 27, namely, the representative patterns of the characteristic of suction force Pi with respect to time T are PiA, PiB, and PiC as shown in FIG. 20.

Time T, the absolute value $|\Delta Pi/\Delta T|$ of the variation of the characteristic of suction force Pi, and the value of suction force Pi are inputted to the deciding section 55. The deciding section 55 decides as follows: (1) Characteristic PiA: after the characteristic reaches a steady state, the absolute value of the saturation value of suction force is greater than the absolute value of a threshold L1 and the absolute value of the limit variation is greater than a threshold L2. This indicates that the absolute value of suction static pressure is great and the resistance of the sufficient air suction duct 6 is small, i.e., sufficient air can be sucked. That is, the deciding section 55 decides that the purifying system is operating normally. Then, the deciding section 55 outputs a signal to the drive signal generating section 56. As a result, the normal drive continues with the water feeding means 3 and the air electromagnetic valve 51 turned on and the auxiliary air supply means 8, the first informing means 57, and the second informing means 58 turned of.

(2) Characteristic PiB: after the characteristic reaches a steady state, the limit absolute value of the variation is greater than the limit values L2, but the absolute value of the suction pressure saturation value is smaller than the absolute value of the limit value L1. This condition is interpreted to means that the resistance of the air suction duct 6 is small, but the absolute value of the suction static pressure is small. That is, it is decided that the air sucking performance is insufficient. Then, the deciding section 55 outputs the signal to the drive signal generating section 56. As a result, the water feeding means 3 and the air electromagnetic valve 51 are turned on and the auxiliary air supply means 8 operates. In addition, the first informing means 57 for indicating an insufficient air sucking force is turned on, thus indicating the decrease of the flow rate of the circulating water to the exterior. The second informing means 58 remains OFF. (3) Characteristic Pic: after the characteristic reaches steady state, the absolute value of the saturation value of suction force is greater than the absolute value of a threshold L1, but the absolute value of the variation is smaller than the threshold L2. This indicates that the absolute value of suction static pressure is great and the resistance of the air suction duct 6 is great, and as such the air flow duct is clogged. Then, the deciding section 55 outputs a signal to the drive signal generating section 56. As a result, the water feeding means 3 and the air electromagnetic valve 51 are turned on and the auxiliary air supply means 8 operates. In addition, the second indicating means 58 is turned on, thus informing the clogging of the air duct to the exterior. The first informing means 57 remains OFF.

According to the construction of this embodiment, the deteriorated performance of the water circulation circuit and the clogging of the air duct can be indicated simultaneously.

Figure 21:
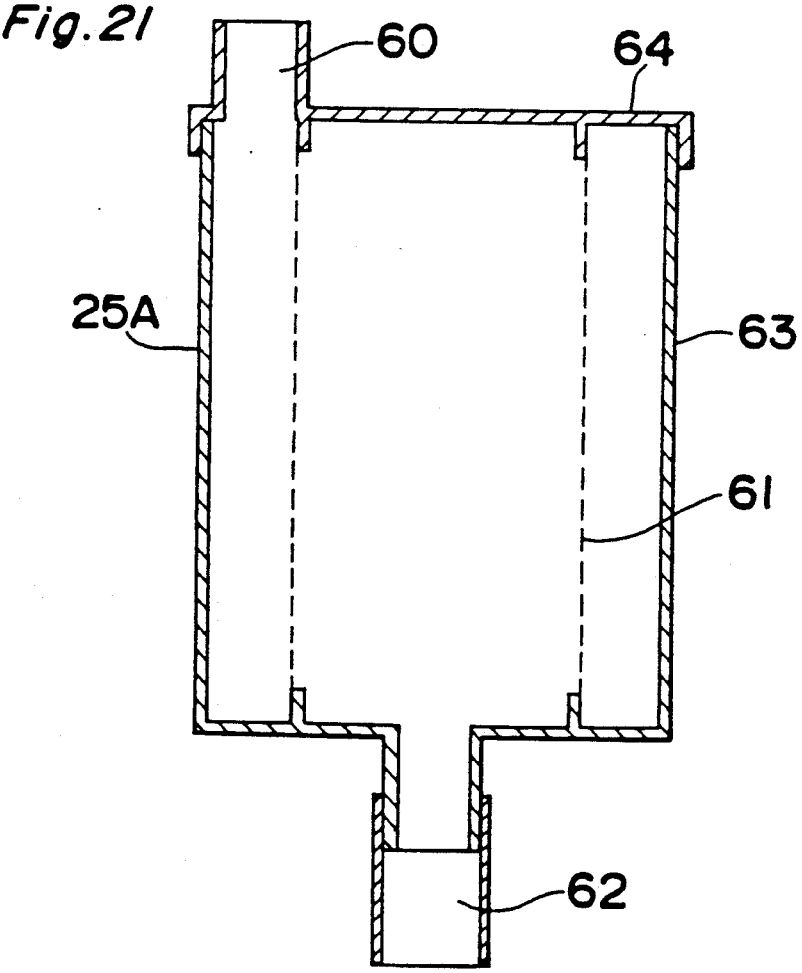
FIG. 21 is a sectional view showing a moss-growth preventing/sterilizing filter mounted in a water purifying apparatus according to an embodiment of the present invention.

FIG. 21 is a sectional view showing a moss-growth/sterilizing filter unit 25A. The filter unit 24A comprises an inflow port 60, an outflow port 62, and a moss-growth/sterilizing filter 61. The water of the water tank is filtered by the moss-growth/sterilizing filter 61 and flows out from the outflow port 62 communicating with the water feeding means 3. In order to remove the filter 61 from the filter unit 25A, a cover 64 of a filter casing 63 is removed from the filter unit 25A. The filter 61 is made of materials, shown in Table 2, which prevent moss from growing or slime from being formed by bacteria even though the $NO_3$—N concentration in the water in the water tank becomes greater than 200 ppm.

An experiment for examining slime generation was conducted as follows: A device used in the experiment has the filer 61, made of materials shown in Table 2, provided in the duct connected with a water tank of 200l. The experiment was conducted by setting the volume of water to be 200l (the number of bacteria contained in the water was $5 \times 10^6$/ml), the flow rate of the circulating water as 40l/min, the water temperature as 40° C., and the drive time as 15 minutes. The degree of slime generation was evaluated according to the degree of adherence of bacteria to the filter 61 and the propagation condition of bacteria. The state in which no bacteria adhered to the filter 61 and no bacteria propagated themselves was evaluated as "did not grow".

The experiment of moss generation was conducted by using a purifying apparatus having a filter unit 25A mounted therein incorporating a 20-mesh cylindrical filter. A fish tank used was as shown in FIG. 4. The diameter of the filter is 3 cm and the length thereof is 5 cm. The experiment was conducted by setting the volume of water in the tank as 100 l (NO$_3$—N density: 200 ppm), the number of fish as 20, flow rate of the circulating water as 4 l/min. and water temperature as 27° C. The experiment was continued for six months. Whether or not moss grew on the filter 61 was visually evaluated. Experimental results are shown in Table 2 below.

TABLE 2

| Materials which prevent the growth of moss and sterilize bacteria | |
|---|---|
| material | moss and smite |
| 1. silver or silver chloride | did not grow |
| 2. chlorohexydine gluconate | did not grow |
| 3. copper or copper sulfide | did not grow |
| 4. titanium | did not grow |
| 5. 5-chloro-2-(2,4-dichlorophenoxy) phenol | did not grow |
| 6. stainless steel | did not grow |
| 7. dodecylguanidine hydrochloride | did not grow |
| 8. thiapentazole | did not grow |
| 9. a-Bromocinnamaldehyde | did not grow |
| 10. silicone quaternary ammonium salt | did not grow |
| 11. Alkyldi (aminoethyl) glycine hydrochloride | did not grow |
| 12. 10,10'-Oxybisphenoxyarsine | did not grow |
| 13. polypropylene | grew |

Since the filter made materials of (1)~(12) shown in Table 2 from removed from foreign matter which from grew or existed in the water of the water tank and moss and slime did not grow, the resistance to the water was very small. Thus, the filter can be reliably used for a long period of time.

Figure 22:
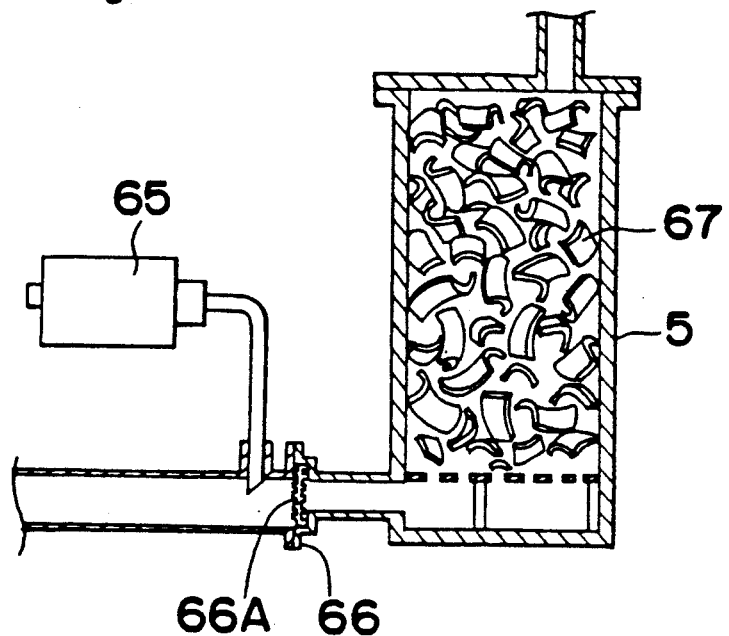
FIG. 22 is a sectional view showing an air supply means of a water purifying apparatus according to an embodiment of the present invention.

FIG. 22 shows an air supply means according to another embodiment. The water purifying unit 2 is the same as that of FIG. 4 in its construction. A conventional air pump 65 and a bubble atomizing means 66 for atomizing air contained in water by the air pump 65 are provided upstream of the bacteria culturing tank 5. The bubble atomizing means 66 consisting of a metal net or a high-speed agitation blade is inserted into a water duct. According to this embodiment, the bubble atomizing means 66 consists of a metal net 66A. The bacteria culturing tank 5 accommodates a carrier 67 of individual pieces with a large surface and positioned so as to have a great number of voids 68, for fixing bacteria easily adhere to the carrier 67 and the carrier 67 is capable of contacting water over a great area.

Figure 23:
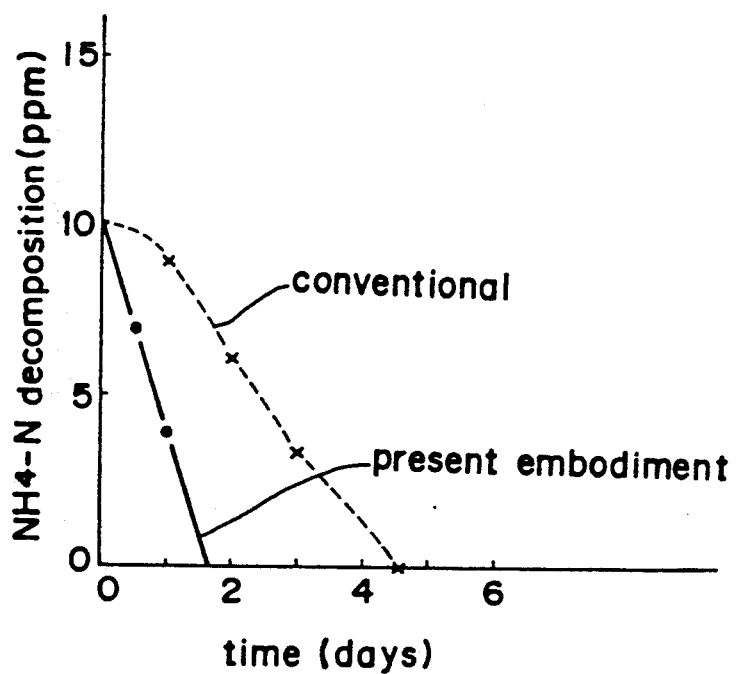
FIG. 23 is a graph showing the characteristic of a water purifying apparatus of an air supply means according to the present invention and an air supply means of a conventional art.

FIG. 23 are graphs showing the characteristic of this embodiment in which air is supplied to the bacteria culturing tank 5 by means of the air supply means 4 having an air atomizing function and that of a conventional water purifying apparatus in which air is directly supplied to the bacteria culturing tank without using an atomizing means. The graph shows the characteristic of ammonia decomposition relative to the passage of time. As shown in FIG. 23, the embodiment is superior to the conventional art in decomposing ammonia in the water tank.

Figure 24:
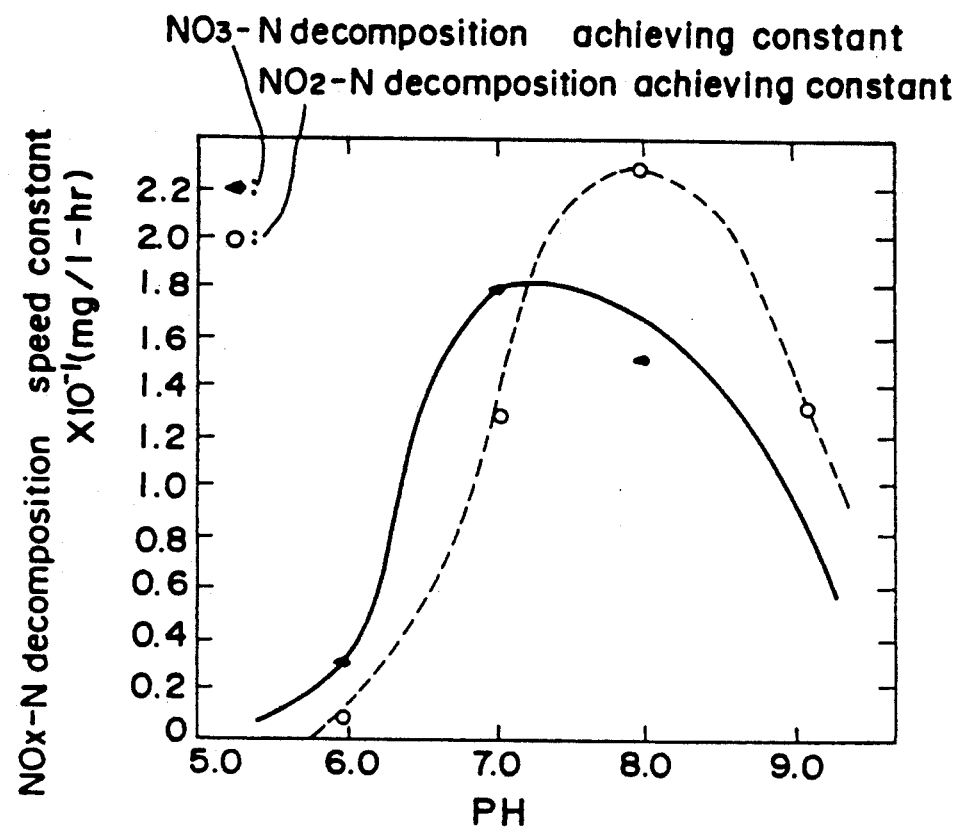
FIG. 24 is a graph showing the relationship between the pH of water and the generation speed constant of $NO_2$ and $NO_3$.

FIG. 24 shows the relationship between the activity of bacteria which decompose NH$_4$+ and NO$_2$- and the pH of water. As shown in FIG. 24, bacteria are very active when pH is greater than 7. In particular, the pH of bacteria, which decompose NH$_4$+ to form NO$_2$-, described previously with reference to equation (1) shows the highest activity when the pH is eight.

The effect of a bacteria fixing material capable of setting the pH of the water in the bacteria culturing tank 5 to be approximately eight, the configuration thereof, and the effect of the ultraviolet lamp were evaluated by the following experiment.

The fish tank used in the experiment was tapered to the bottom thereof so that organic substances which collected in the bottom portion thereof could be easily discharged outside the fish tank. The volume of the fish tank was 100 l and water temperature was 27±1° C.

The volume of the bacteria culturing tank 5 accommodating the bacteria fixing carrier was 5 l. Air was supplied to the bacteria culturing tank 5 at the rate of 0.8 l/min. by the air supply means 4. Since the amount of oxygen in the supplied air was more than that necessary for oxidizing ammonia and nitrous acid in the water to form nitric acid, the amount of dissolved oxygen in water which passed through the water purifying unit 2 was such as to place the water in a saturated state. Thus, aeration was not performed unlike the conventional art which uses an air diffusing pipe and an air pump.

Figure 25:
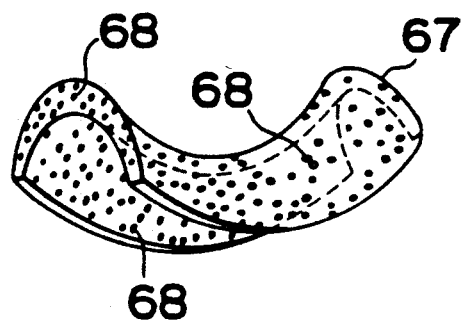
FIG. 25 is a perspective view showing a bacteria fixing carrier according to an embodiment of the present invention.

Six kinds of bacteria fixing carriers were used in the experiment. Materials from (1) through (5) were basic and a material (6) was neutral. The bacteria fixing carriers were curved and saddle-shaped and were similar in configurations thereof as shown in FIG. 25.

Twenty tropical fishes of approximately 5 cm were bred. Flow rate of water was 5 l/min. and the air supply means operated for one month to measure the pH, alkali ion amount, ammonia amount in the bacteria culturing tank 5, and the number of bacteria in the water tank 1 and the growth state of moss therein was examined. The results are shown in Table 3.

In addition, the product of the period of time required for the water of the water tank 1 to pass through the container 23 and to be irradiated by rays emitted by the ultraviolet lamp 22 positioned downstream of the bacteria culturing tank 5 and the illuminance of ultraviolet rays was 10$^5$/μwsec/cm$^2$.

TABLE 3

| Material of carrier for fixing water purifying bacteria | | | |
|---|---|---|---|
| material | pH | increase of amount (ppm) of alkali ion | ammonia amount (ppm) |
| (1) ceramic consisting blast furnace slag (CaO: 43.3%, SiO$_2$: 33.3%, Al$_2$O$_3$: 14.1%, others: 9.4%) | 8.0 | Ca$^{2+}$27 | 0 |
| (2) sodium silicate (Na$_2$O: 32.4%, SiO$_2$: 67.6%) | 8.1 | Na$^+$28 | 0 |
| (3) sodium silicate (Na$_2$O: 25%, SiO$_2$: 75%) | 7.9 | Na$^+$25 | 0 |
| (4) potassium silicate (K$_2$O: 32%, SiO$_2$: 68%) | 8.1 | K$^+$28 | 0 |
| (5) alloy of magnesium (Mg: 96%, Al: 3%, Zn: 1%) | 8.1 | Mg$^{2+}$26 | 0 |
| (6) polyvinyl alcohol | 5.8 | 0 | 0.8 |

H$^+$ and NO$_3$- (reaction equations (1) and (2)) formed by oxidizing ammonia in the bacteria culturing tank 5 were neutralized by the carrier, consisting of basic substances of (1)~(5) of Table 3, for fixing the water purifying bacteria, provided in the bacteria culturing tank 5. Thus, the reduction of the pH of the water in the bacteria culturing tank 5 was prevented and as such, the pH was maintained in the range from 7 to 8.5 in which the water purifying bacteria show the highest activity. According to the conventional carrier not made of basic substances but made of polyvinyl alcohol, NO$_3$- formed as a result of the decomposition of ammonia and nitrous acid cannot be neutralized. Accordingly, the pH of the water in the bacteria culturing tank 5 gradually decreases and consequently, the activity of the water purifying bacteria decreases. The reduction of the activity of the water purifying bacteria does not allow ammonia to be decomposed. Therefore, the water of the water (fish) tank cannot be purified. Owing to the use of the ultraviolet lamp of the present invention, the number of bacteria in the water tank was $1.5 \times 10$/ml and no moss grew while without the use of the ultraviolet lamp, the number of bacteria in the water tank was $1.4 \times 10^5$/ml and moss grew on the inner surface of the water (fish) tank.

As apparent from the foregoing description, the following advantages can be obtained by the water purifying apparatus of the present invention:

(a) Bacteria are used to purify water and fluid energy of circulating water is utilized to induce air in supplying air to the bacteria culturing tank. That is, since air is supplied to the bacteria culturing tank other than by operating a movable member such as a valve, the water purifying apparatus is capable of maintaining the purifying performance thereof for a long period of time.

(b) Air sucked in by the air supply means is atomized by a high-speed jet flow fed out from the supply nozzle and, dispersed uniformly in the water. As a result, the degree of activity of bacteria is increased and bacteria can be cultured at a high density.

(c) Even if air is fed into the bacteria culturing tank in a decreasing amount as a result of the deterioration of the circulation of the water, the air flow detecting means detects the decrease of air flow rate. As a result, the auxiliary air supply means operates to supplement the insufficient amount of air. Thus, the water purifying apparatus is capable of maintaining the purifying performance thereof.

(d) The progress of the deterioration of the performance of water purifying apparatus can be quantitatively evaluated by forcibly decreasing the flow rate of the circulating water at certain intervals of time. Thus, trouble in the water purifying apparatus can be rectified and as such, the apparatus is capable of reliably purifying water.

(e) Foreign matter contained in the water of the water tank can be removed by the moss-growth preventing/sterilizing filter. Therefore, the foreign matter does not adhere to the means for feeding water under pressure, the air supply means or the bacteria culturing tank. Thus, the apparatus is capable of continuing a reliable water purification for a long period of time.

(f) The carrier for fixing water-purifying bacteria consists of basic substances. Therefore, even though acid is formed by decomposing organic substances to composing water, the pH of water in the vicinity of the carrier is kept at approximately eight. Thus, bacteria can maintain a high activity.

In addition, since atomized air is supplied to the bacteria culturing tank, bacteria can decompose organic substances in water effectively.

(g) Carriers for fixing water-purifying bacteria are saddle-shaped and curved. Therefore, the carriers do not overlap with each other and can contact water in a great area in the bacteria culturing tank. Thus, bacteria can be cultured uniformly in a great area in the bacteria culturing tank. Thus, the apparatus can purify water efficiently.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A water purifying apparatus comprising:
   a water feeding means for feeding water under a feeding pressure and drawn from a tank holding water to be purified;
   a water circulating duct means connected to an output from said water feeding means for circulation the water being fed under a feeding pressure;
   a bacteria culturing tank means to which said water circulating duct is connected for receiving circulated water and for purifying the circulating water for return to the tank;
   an air supply means connected in said water circulating duct upstream of said bacteria culturing tank and having an air inlet opening laterally into said duct means for inducing air into the circulating water and having air flow means connected to said air inlet opening for directing a flow of air into said air inlet opening; and
   a detecting means provided in said air flow means for detecting when air is being induced into the feeding water circulating in said water circulating duct means at less than a predetermined rate.

2. A water purifying apparatus as claimed in claim 1 in which said air supply means is a supply nozzle having an inflow portion, a constricted portion and outflow portion, said air inlet opening opening into said outflow portion adjacent said constricted portion.

3. A water purifying apparatus as claimed in claim 1 wherein said detecting means comprises means for outputting a signal when the air flow is less than a predetermined rate, and said apparatus further comprising an indicator means connected to said detecting means for indicating when the air flow into the feeding water is less than a predetermined rate in response to said outputted signal.

4. A water purifying apparatus as claimed in claim 3 in which said indicator means is provided in the vicinity of the remainder of said apparatus.

5. A water purifying apparatus as claimed in claim 1 wherein said detecting means comprises a container having an air inlet port and an air outlet port connected in series in said air flow means, said air inlet port being above said air outlet port, and a self-exothermic thermistor in said container at a level above said outlet port.

6. A water purifying apparatus as claimed in claim 1 wherein said air flow means comprises an air suction duct connected with said inlet opening of said air supply means, and said detecting means comprises an air pressure sensor in said air suction duct.

7. A water purifying apparatus as claimed in claim 1 in which said detecting means comprises a container having an air inlet port and an air outlet port connected in series in said air flow means, said air inlet port having a check valve blocking flow out of said container, and a water level sensing means in said container for being actuated when water rises above a predetermined level in said container.

8. A water purifying apparatus as claimed in claim 7 in which said water level sensing means is a float actuated switch.

9. A water purifying apparatus as claimed in claim 1 in which said detecting means comprises a container having an air inlet port connected in series in said air flow means with said air inlet port above said air outlet port, and opaque float in said container blocking said air inlet port when it rises in said container, and a light emitting member and a light receiving member opposed to each other along a path across said air inlet port and between which said float is located when said float blocks said air inlet port.

10. A water purifying apparatus as claimed in claim 1 wherein said detecting means comprises means for outputting a signal when the air flow is less than a predetermined rate, and said apparatus further comprises auxiliary air supply means connected to said air flow means for providing supplemental air to said air supply means, and auxiliary air control means connected to said auxiliary air supply means and to said detecting means for controlling the operation of said auxiliary air supply means in response to the signal outputted from said detecting means.

11. A water purifying apparatus as claimed in claim 10 further comprising means associated with said water circulating duct for varying the flow rate of circulating water therein to an amount less than a normal amount and greater than said predetermined rate, and said detecting means further comprising means for outputting no signal when said amount less than a normal amount and greater than said predetermined rate has been detected, and an indicator means connected to said auxiliary air control means for outputting a signal when said auxiliary air supply means has been actuated, whereby when said indicator outputs no signal, this is an indication that said apparatus is operating normally.

12. A water purifying apparatus as claimed in claim 10 further comprising means associated with said means for feeding water under a feeding pressure for varying the operation thereof to vary the flow rate of the circulating water to an amount less than a normal amount and greater than said predetermined rate, and said detecting means further comprising means for outputting no signal when said amount less than a normal amount and greater than said predetermined rate has been detected, and an indicator means connected to said auxiliary air control means for outputting a signal when said auxiliary air supply means has been actuated, whereby when said indicator outputs no signal, this is an indication that said apparatus is operating normally.

13. A water purifying apparatus as claimed in claim 10 further comprising means associated with said air flow means for varying the resistance to air flow through said air flow means to change a suction at said detecting means to an amount indicating that the air flow is less than a normal amount and greater than a predetermined amount, and said detecting means further comprising means for outputting no signal when said amount less than a normal amount and greater than said predetermined rate has been detected, and an indicator means connected to said auxiliary air control means for outputting a signal when said auxiliary air supply means has been actuated, whereby when said indicator outputs no signal, this is an indication that said apparatus is operating normally.

14. A water purifying apparatus as claimed in claim 10 further comprising valve means in said air flow means for stopping the air flow through said air flow means to change a suction at said detecting means to an amount indicating that the air flow is less than a normal amount and greater than a predetermined amount, a differentially means connected to said detecting means for generating a characteristic of the air flow according to the output of said detecting means relative to time, a deciding means connected to said differentiating section for deciding which of a normal air flow characteristic, an air flow characteristic for an air flow less than the normal air flow but greater than a predetermined value, and an air flow characteristic for an air flow less than a predetermined value is being outputted from said differentiating section, a drive signal generating section connected to said deciding means for outputting a driving signal to at least one of said valve means, a first warning means, a second warning means, said auxiliary air feed means and said water feeding means in response to the output from said deciding means, and a signal generating means for generating a checking signal connected to said drive signal generating section for causing said drive signal generating section to actuate said valve means in response thereto.

15. A water purifying apparatus comprising:
 a water feeding means for feeding water under a feeding pressure and drawn from a tank holding water to be purified;
 a water circulating duct connected to an output from said water feeding means and for circulating water under a feeding pressure;
 a bacteria culturing tank to which said water circulating duct is connected for receiving circulated water and for purifying the water for return to the tank;
 an air supply means connected in said water circulating duct upstream of said bacteria culturing tank and having an air inlet opening laterally into said duct for admitting air for being induced into the circulating water and having air flow means connected to said air inlet opening for directing air into said air inlet opening; and
 a moss-growth preventing/sterilizing filter connected in said water circulating duct upstream of said air supply means, said filter having a filter unit therein consisting of at least one of the moss-growth preventing/sterilizing materials taken from the group consisting of:
  1. silver or silver chloride
  2. chlorohexydine gluconate
  3. titanium
  4. 5-chloro-2-(2,4-dichlorophenoxy) phenol
  5. dodecylguanidine hydrochloride
  6. thiapentazole
  7. a-bromocinnamaldehyde
  8. silicone guaternary ammonium salt
  9. alkyldi (aminoethyl) glycine hydrochloride
  10. 10,10'-oxybisphenoxyarsine.

* * * * *